(12) United States Patent
Pei (10) Patent No.: US 10,386,014 B2
(45) Date of Patent: Aug. 20, 2019

(54) DESK PLATFORM STRUCTURE FOR FITNESS BIKE

(71) Applicant: Xu Bo Pei, Shenzhen (CN)

(72) Inventor: Xu Bo Pei, Shenzhen (CN)

( * ) Notice: Subject to any disclaimer, the term of this patent is extended or adjusted under 35 U.S.C. 154(b) by 0 days.

(21) Appl. No.: 15/911,186

(22) Filed: Mar. 5, 2018

(65) Prior Publication Data

US 2019/0195421 A1  Jun. 27, 2019

(30) Foreign Application Priority Data

Dec. 22, 2017  (CN) .................... 2017 2 1830433 U (51) Int. Cl.
| | |
|---|---|
| *F16M 13/02* | (2006.01) |
| *A63B 71/06* | (2006.01) |
| *F16M 11/28* | (2006.01) |
| *A47B 23/00* | (2006.01) |
| *F16M 11/04* | (2006.01) |
| *A47B 21/00* | (2006.01) |

(52) U.S. Cl.
CPC ......... *F16M 13/022* (2013.01); *A47B 23/001* (2013.01); *A63B 71/0622* (2013.01); *F16M 11/048* (2013.01); *F16M 11/28* (2013.01); *A47B 21/00* (2013.01); *A47B 2220/06* (2013.01); *A63B 2071/0658* (2013.01); *A63B 2225/68* (2013.01); *A63B 2225/685* (2013.01); *A63B 2225/687* (2013.01); *F16M 2200/028* (2013.01)

(58) Field of Classification Search
CPC ........ A63B 71/0622; A63B 2071/0658; A63B 2225/685; A63B 2225/68; A63B 2225/687; A47B 2220/06; A47B 23/02; A47B 13/003; A47B 1/10; A47B 21/03; A47B 21/00; B62J 2099/0013; B62J 2099/0033; B62J 2099/0026; B62J 7/00; F16M 11/10
USPC ....................................................... 248/455
See application file for complete search history.

(56) References Cited

U.S. PATENT DOCUMENTS

| | | | | |
|---|---|---|---|---|
| 2,836,225 | A * | 5/1958 | Swenson ................... | A47C 9/02 248/397 |
| 4,736,689 | A * | 4/1988 | Stanko ............... | A47B 21/0314 108/143 |
| 4,890,561 | A * | 1/1990 | Hampshire ............ | A47B 21/03 108/102 |
| 5,931,102 | A * | 8/1999 | Grahl ................... | A47B 17/033 108/143 |

(Continued)

*Primary Examiner* — Jonathan Liu
*Assistant Examiner* — Taylor L Morris
(74) *Attorney, Agent, or Firm* — JCIPRNET (57) ABSTRACT

A desk platform structure for a fitness bike, including a desk platform, a desk platform fixing and sliding mechanism and a supporting rod is provided. The desk platform fixing and sliding mechanism includes a pair of fixing bars, a pair of sliding rails, and a fixing rack. The desk platform is installed on the fixing bars which are installed on the sliding rails. The sliding rails are fixed on guiding bars at two sides of the fixing rack which is connected to the supporting rod. A braking mechanism and a control mechanism for sliding and positioning of the fixing bar are disposed between the fixing bar and the fixing rack. Accordingly, the desk platform is more stable and reliable, and may slide and be positioned at any location. It is convenient to use the desk platform by further adjusting the inclination angle of the desk platform.

11 Claims, 5 Drawing Sheets

(56) References Cited

U.S. PATENT DOCUMENTS

| | | | | |
|---|---|---|---|---|
| 6,092,774 A * | 7/2000 | Choy | A47B 21/0314 | 248/176.1 |
| 6,213,438 B1 * | 4/2001 | Ostby | B60R 11/0252 | 224/539 |
| 6,374,754 B1 * | 4/2002 | Chang | A47B 21/00 | 108/102 |
| 6,484,987 B2 * | 11/2002 | Weaver | F16M 11/10 | 248/278.1 |
| 6,568,836 B2 * | 5/2003 | Wahl | F21V 21/34 | 248/298.1 |
| 7,335,147 B2 * | 2/2008 | Jones | A63B 71/0622 | 433/25 |
| 7,594,668 B2 * | 9/2009 | Arceta | A61G 12/001 | 108/147.19 |
| 7,686,742 B2 * | 3/2010 | Tischler | A63B 71/00 | 108/8 |
| 7,887,021 B2 * | 2/2011 | Shevin-Sandy | B62J 11/00 | 108/42 |
| 7,892,148 B1 * | 2/2011 | Stauffer | A63B 22/0235 | 482/51 |
| 8,485,945 B2 * | 7/2013 | Leonhard | A63B 21/0052 | 482/52 |
| 8,734,302 B2 * | 5/2014 | Hsieh | A63B 22/02 | 482/54 |
| 8,740,166 B2 * | 6/2014 | Hamilton | A47B 21/0314 | 108/129 |
| 9,139,213 B2 * | 9/2015 | Trish | A61G 12/001 | |
| 9,403,051 B2 * | 8/2016 | Cutler | A63B 22/02 | |
| 9,498,671 B1 * | 11/2016 | Softky | A63B 22/02 | |
| 9,682,307 B2 * | 6/2017 | Dalebout | A63B 71/0686 | |
| 2003/0008752 A1 * | 1/2003 | Hsu | A63B 71/0622 | 482/55 |
| 2004/0245420 A1 * | 12/2004 | Pfister | F16C 11/103 | 248/289.11 |
| 2007/0225120 A1 * | 9/2007 | Schenk | A63B 24/00 | 482/4 |
| 2008/0096745 A1 * | 4/2008 | Perry | A63B 22/00 | 482/148 |
| 2008/0314851 A1 * | 12/2008 | Jacoby | A47B 23/001 | 211/149 |
| 2010/0206124 A1 * | 8/2010 | Ferrusi | B62K 21/125 | 74/551.8 |
| 2011/0233250 A1 * | 9/2011 | Nakajima | B62J 9/008 | 224/567 |
| 2011/0237396 A1 * | 9/2011 | Lu | A63B 71/0619 | 482/1 |
| 2012/0145759 A1 * | 6/2012 | Shih | B62J 7/00 | 224/412 |
| 2012/0211634 A1 * | 8/2012 | Yang | H01Q 1/1221 | 248/397 |
| 2012/0307422 A1 * | 12/2012 | Wang | A47B 21/00 | 361/679.01 |
| 2012/0314345 A1 * | 12/2012 | Wang | A63B 22/02 | 361/679.01 |
| 2013/0040782 A1 * | 2/2013 | Hjort | A61H 1/0237 | 482/8 |
| 2013/0116095 A1 * | 5/2013 | Hsieh | A63B 22/02 | 482/54 |
| 2013/0134196 A1 * | 5/2013 | Lee | B62J 11/00 | 224/448 |
| 2013/0150214 A1 * | 6/2013 | Wu | A63B 71/0622 | 482/4 |
| 2013/0178334 A1 * | 7/2013 | Brammer | A63B 71/0622 | 482/4 |
| 2013/0200586 A1 * | 8/2013 | Trish | B62B 3/00 | 280/79.3 |
| 2013/0281274 A1 * | 10/2013 | Ferrusi | F16M 13/022 | 482/148 |
| 2014/0073489 A1 * | 3/2014 | Wu | A63B 22/0605 | 482/57 |
| 2014/0076206 A1 * | 3/2014 | McCabe | A47B 23/02 | 108/5 |
| 2014/0183323 A1 * | 7/2014 | Sheldon | A47B 23/043 | 248/455 |
| 2015/0011362 A1 * | 1/2015 | Oh | A63B 22/0605 | 482/9 |
| 2017/0095694 A1 * | 4/2017 | Polinsky | A63F 13/211 | |
| 2017/0105523 A1 * | 4/2017 | McBride | A47B 83/02 | |
| 2017/0120102 A1 * | 5/2017 | Chen | A63B 24/0087 | |
| 2017/0259111 A1 * | 9/2017 | Hsieh | A63B 22/0605 | |
| 2018/0353804 A1 * | 12/2018 | Pei | A63B 22/0605 | |

* cited by examiner

DESK PLATFORM STRUCTURE FOR FITNESS BIKE

CROSS-REFERENCE TO RELATED APPLICATION

This application claims the priority benefit of China application serial no. 201721830433.5, filed on Dec. 22, 2017. The entirety of the above-mentioned patent application is hereby incorporated by reference herein and made a part of this specification.

BACKGROUND OF THE INVENTION

1. Field of the Invention

The present invention relates to the technical field of exercise and fitness devices, and specifically to a desk platform structure for a fitness bike.

2. Description of Related Art

With the acceleration of the pace of life, life pressures of people are increasing, and people have an increasingly short time to participate in sports. Therefore, people invented various indoor exercise and fitness equipment such as treadmills, fitness bikes, and sit-up benches. After a treadmill or a fitness bike is equipped with a desk platform, people sometimes can further exercise while working. A desk platform on a conventional fitness bike is not adjustable. As a result, when people place different articles, some inconveniences are caused, and some use inconveniences are also caused for persons at different heights. To resolve this problem, someone invented an adjustable desk platform that is usually adjusted by installing sliding rails. However, the desk platform adjusted by using sliding rails on the current market usually has the following problem. For example, due to a problem of cooperation between the sliding rails, the desk platform swings, and during sliding adjustment, a phenomenon of excessively quick sliding also usually occurs. Not only the experience feeling is not good, but also articles on the desk platform may drop out. For another example, for not a few desk platforms, the desk platforms are pushed to slide if only a larger force is applied to support edges of the desk platforms. As a result, inconvenience is also caused to usage.

SUMMARY OF THE INVENTION

For the defect in the prior art, the present invention provides a desk platform structure for a fitness bike that is more proper in structural design, more convenient in use, and more stable and reliable.

To resolve the foregoing technical problem, the following technical solution is used in the present invention: a desk platform structure for a fitness bike, including a desk platform, a desk platform fixing and sliding mechanism, and a supporting rod, where the desk platform is installed on the desk platform fixing and sliding mechanism, the desk platform fixing and sliding mechanism is installed on the supporting rod, and the supporting rod is installed on a fitness bike, where the desk platform fixing and sliding mechanism includes a pair of fixing bars, a pair of sliding rails, and a fixing rack, the desk platform is installed on the fixing bars, the fixing bars are installed on the sliding rails to form a slidable structure, and the sliding rails are fixed on guiding bars at two sides of the fixing rack; a fixing base is further disposed on the fixing rack, and the fixing base and the supporting rod are connected to form a rotatable angle adjustment structure; and a braking mechanism configured to guarantee stable slip of the desk platform is disposed between the fixing bar and the fixing rack, and a control mechanism configured to control sliding and positioning of the fixing bar is further disposed between the fixing bar and the fixing rack.

Further, the control mechanism configured to control sliding and positioning of the fixing bar includes an adjustment handle, a torsional spring, and an adjustment base, the adjustment base is disposed on an outer side surface of the fixing bar at a side, and a positioning sheet extending outward to form a cam shape is disposed on the adjustment handle; a side wall of the guiding bar at the same side as that of the fixing bar provided with the adjustment base is provided with several positioning slots matching the positioning sheet, and the positioning sheet is locked in a positioning slot to form a slip stopping and positioning structure of the fixing bar; and the adjustment handle is inserted in the adjustment base in a rotatable manner, the torsional spring is sleeved over the adjustment handle, and two ends of the torsional spring are respectively fixed on the adjustment base and the positioning sheet to form a torque resetting structure. The adjustment handle is rotated by using a hand, so that the positioning sheet is separated from the positioning slot, to remove the locking. In this case, the desk platform can be slided. After the sliding is in place, the adjustment handle is released. Under the action of the torsional spring, the positioning sheet is automatically locked in the positioning slot and is positioned. In this case, the desk platform cannot be slided.

Further, a rubber cover for convenience of operation is sleeved over the adjustment handle, and a location at which the adjustment handle extends out of the adjustment base is provided with a shaft clip for auxiliary fixing; and a knurl wheel is disposed on the guiding bar provided with the positioning slots, and the knurl wheel is disposed in front of a foremost positioning slot to form a forward-slip stopping structure for the fixing bar, so that the desk platform does not slide forward excessively.

Further, the braking mechanism configured to guarantee stable slip of the desk platform includes two groups of braking assemblies, the two groups of braking assemblies are disposed in tandem, each group includes a clamping base, a fixing shaft, and a braking space ring, the braking space ring is installed in the clamping base by using the fixing shaft, the clamping base is fixed in the guiding bar on at least one side of the fixing rack by using a bolt, and the braking space ring and an outer side surface of the fixing bar are in interference fit, to form a structure having rolling friction between the braking space ring and the fixing bar; and the braking space ring is made of a soft material. When the desk platform is slided, because the braking space ring has extrusion and friction actions on the fixing bar, first, the fixing bar does not swing, to ensure entire stability of the desk platform; and secondly, the fixing bar does not slide excessively quickly, and the sliding process is more gentle and stable, so that no article on the desk platform drops out even when the sliding occurs.

Further, the braking mechanism configured to guarantee stable slip of the desk platform includes two groups of braking assemblies, the two groups of braking assemblies are disposed in tandem, each group includes an extrusion ring, the clamping base is fixed in the guiding bar on at least one side of the fixing rack, and an end surface of the extrusion ring and an outer side surface of the fixing bar are in interference fit, to form a structure having sliding friction between the extrusion ring and the fixing bar; and the extrusion ring is made of a soft material. When the desk platform is slided, because the extrusion ring has extrusion and friction actions on the fixing bar, first, the fixing bar does not swing, to ensure entire stability of the desk platform; and secondly, the fixing bar does not slide excessively quickly, and the sliding process is more gentle and stable, so that no article on the desk platform drops out even when the sliding occurs.

Further, the desk platform includes a primary tray and a secondary tray, the primary tray is provided with an installation slot, and the secondary tray is installed in the installation slot by using a secondary-tray supporting block. Labor division and collaboration can be implemented, and it is convenient to place articles of different sizes, such as a mobile phone or a notebook computer.

Further, a stop bar is disposed in front of the secondary tray, and the stop bar is fixed in the primary tray transversely. Therefore, some relatively small articles such as a mobile phone and a tablet computer can be stopped.

Further, the desk platform structure further includes a meter panel, where the meter panel is installed at a front end of the primary tray by using a meter panel fixing sheet, the meter panel fixing sheet is of a bent structure, and two ends of the meter panel fixing sheet are connected and fixed to the meter panel and the primary tray respectively in an insertion manner. Therefore, rapid dismounting or installing can be implemented.

Further, the fixing base has two fixing holes of a same structure and two arc guide holes of a same structure from left to right, the arc guide holes are located below the fixing holes, an upper end of the supporting rod is installed in the fixing holes by using a fixing threaded rod to form a rotatable structure, the supporting rod and the arc guide holes are connected by separately using a limit threaded rod and a hand screw to form an angle adjustable structure below the fixing threaded rod, the length of each of the arc guide hole is greater than the diameter of the limit threaded rod and the diameter of the hand screw, and the limit threaded rod and the hand screw have activity allowance in the arc guide holes. By loosening the hand screw, an angle between the supporting rod and the fixing base can be adjusted, thereby adjusting an inclination angle of the desk platform, so as to better meet user requirements.

Preferentially, the braking space ring is made of nylon, rubber, or soft plastic, and the extrusion ring may also be made of a same material.

According to the present invention, by means of cooperation between mechanisms such as the fixing bar, the sliding rail, the fixing rack, the sliding and positioning control mechanism, the braking mechanism, and the supporting rod fixing structure, the desk platform may slide forward or backward at will and is positioned at any location. Further, a smoother, more stable, and gentler sliding process may be implemented for the desk platform, and the desk platform does not obviously swing, and is more stable and reliable. Moreover, the inclination angle of the desk platform can be further adjusted, and it is convenient for a user to use the desk platform.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

In the figures, 1 represents a meter panel, 2 represents a meter panel fixing sheet, 3 represents a secondary tray, 4 represents a secondary-tray supporting block, 5 represents a primary tray, 6 represents a shaft clip, 7 represents a torsional spring, 8 represents an adjustment handle, 9 represents a rubber cover, 10 represents a knurl wheel, 11 represents a fixing bar, 12 represents a sliding rail, 13 represents a bolt, 14 represents a fixing rack, 15 represents a hand screw, 16 represents a supporting rod, 17 represents a fixing base, 18 represents a fixing threaded rod, 19 represents a limit threaded rod, 20 represents a guiding bar, 21 represents a clamping base, 22 represents a fixing shaft, 23 represents a braking space ring, 24 represents a stop bar, 25 represents an adjustment base, 26 represents a positioning sheet, 27 represents a positioning slot, 28 represents an arc guide hole, and 29 represents an extrusion ring.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In this embodiment, referring to FIG. 1 to FIG. 7, a desk platform structure for a fitness bike includes a desk platform, a desk platform fixing and sliding mechanism, and a supporting rod 16, where the desk platform is installed on the desk platform fixing and sliding mechanism, the desk platform fixing and sliding mechanism is installed on the supporting rod 16, and the supporting rod 16 is installed on a fitness bike; the desk platform fixing and sliding mechanism includes a pair of fixing bars 11, a pair of sliding rails 12, and a fixing rack 14, the desk platform is installed on the fixing bars 11, the fixing bars 11 are installed on the sliding rails 12 to form a slidable structure, and the sliding rails 12 are fixed on guiding bars 20 at two sides of the fixing rack 14; a fixing base 17 is further disposed on the fixing rack 14, and the fixing base 17 and the supporting rod 16 are connected to form a rotatable angle adjustment structure; and a braking mechanism configured to guarantee stable slip of the desk platform is disposed between the fixing bar 11 and the fixing rack 14, and a control mechanism configured to control sliding and positioning of the fixing bar 11 is further disposed between the fixing bar 11 and the fixing rack 14.

The control mechanism configured to control sliding and positioning of the fixing bar 11 includes an adjustment handle 8, a torsional spring 7, and an adjustment base 25, the adjustment base 25 is disposed on an outer side surface of the fixing bar 11 at a side, and a positioning sheet 26 extending outward to form a cam shape is disposed on the adjustment handle 8; a side wall of the guiding bar 20 at the same side as that of the fixing bar 11 provided with the adjustment base 25 is provided with several positioning slots 27 matching the positioning sheet 26, and the positioning sheet 26 is locked in a positioning slot 27 to form a slip stopping and positioning structure of the fixing bar 11; and the adjustment handle 8 is inserted in the adjustment base 25 in a rotatable manner, the torsional spring 7 is sleeved over the adjustment handle 8, and two ends of the torsional spring 7 are respectively fixed on the adjustment base 25 and the positioning sheet 26 to form a torque resetting structure. The adjustment handle 8 is rotated by using a hand, so that the positioning sheet 26 is separated from the positioning slot 27, to remove the locking. In this case, the desk platform can be slided. After the sliding is in place, the adjustment handle 8 is released. Under the action of the torsional spring 7, the positioning sheet 26 is automatically locked in the positioning slot 27 and is positioned. In this case, the desk platform cannot be slided.

A rubber cover 9 for convenience of operation is sleeved over the adjustment handle 8, and a location at which the adjustment handle 8 extends out of the adjustment base 25 is provided with a shaft clip 6 for auxiliary fixing; and a knurl wheel 10 is disposed on the guiding bar 20 provided with the positioning slots 27, and the knurl wheel 10 is disposed in front of a foremost positioning slot 27 to form a forward-slip stopping structure for the fixing bar 11, so that the desk platform does not slide forward excessively.

Figure 6:
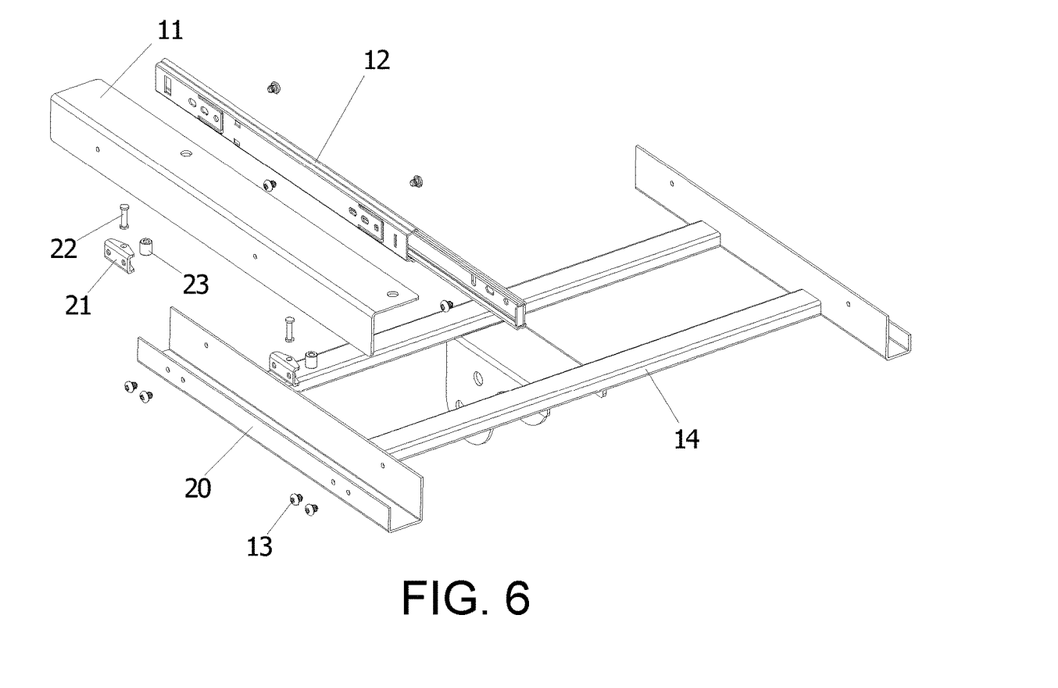
FIG. 6 is a schematic exploded diagram of a first preferable embodiment of a sliding braking structure.
Figure 7:
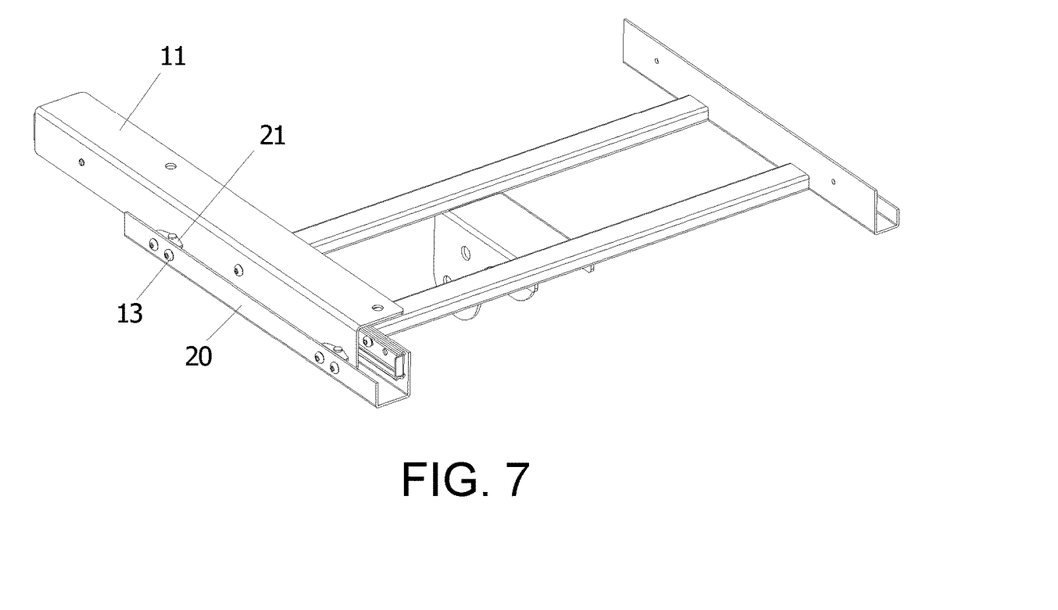
FIG. 7 is a schematic structural diagram of the first preferable embodiment of the sliding braking structure.

The braking mechanism configured to guarantee stable slip of the desk platform includes two groups of braking assemblies, the two groups of braking assemblies are disposed in tandem, each group includes a clamping base 21, a fixing shaft 22, and a braking space ring 23, the braking space ring 23 is installed in the clamping base 21 by using the fixing shaft 22, the clamping base 21 is fixed in the guiding bar 20 on one side of the fixing rack 14 by using a bolt 13, and the braking space ring 23 and an outer side surface of the fixing bar 11 are in interference fit, to form a structure having rolling friction between the braking space ring 23 and the fixing bar 11; and the braking space ring 23 is made of a soft material. When the desk platform is slided, because the braking space ring 23 has extrusion and friction actions on the fixing bar 11, first, the fixing bar 11 does not swing, to ensure entire stability of the desk platform; and secondly, the fixing bar 11 does not slide excessively quickly, and the sliding process is more gentle and stable, so that no article on the desk platform drops out even when the sliding occurs.

Figure 1:
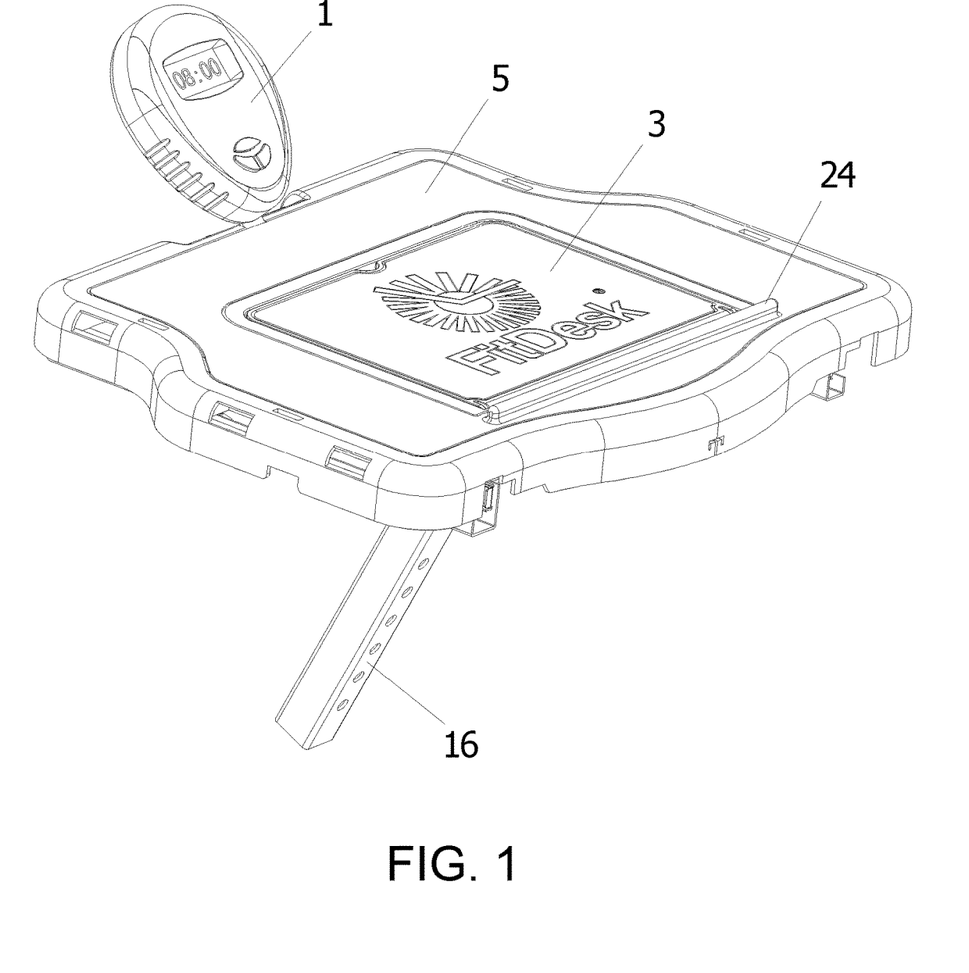
FIG. 1 is a schematic diagram of an entire structure according to the present invention.
Figure 2:
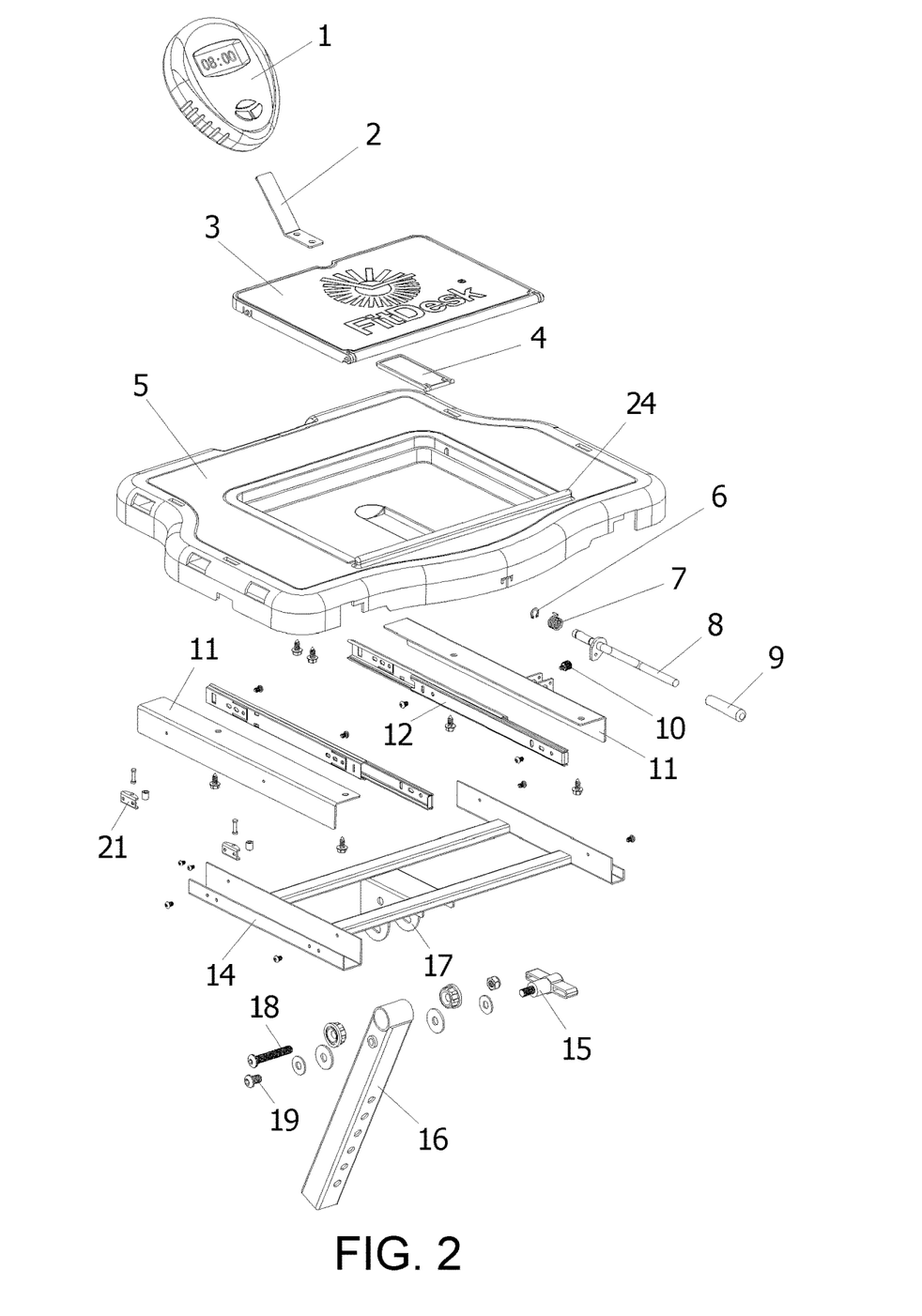
FIG. 2 is a schematic diagram of an exploded structure according to the present invention.
Figure 3:
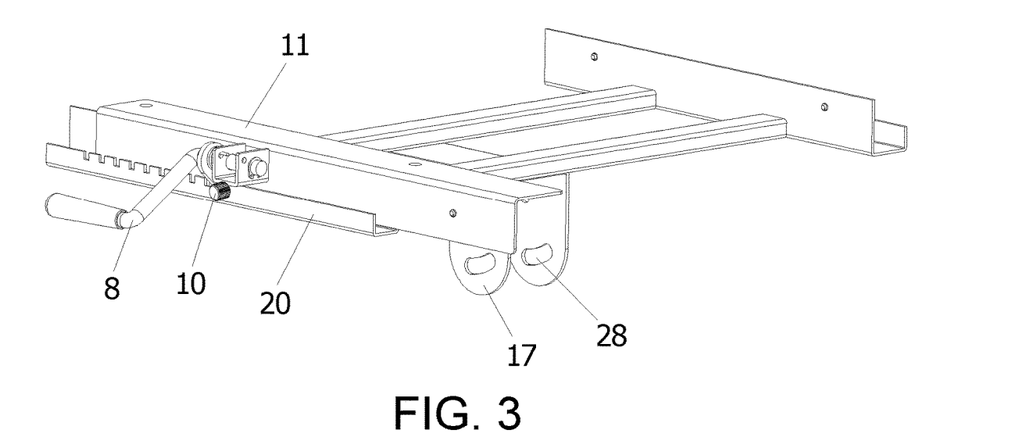
FIG. 3 is a schematic structural diagram of a sliding positioning mechanism sliding to a foremost end.
Figure 4:
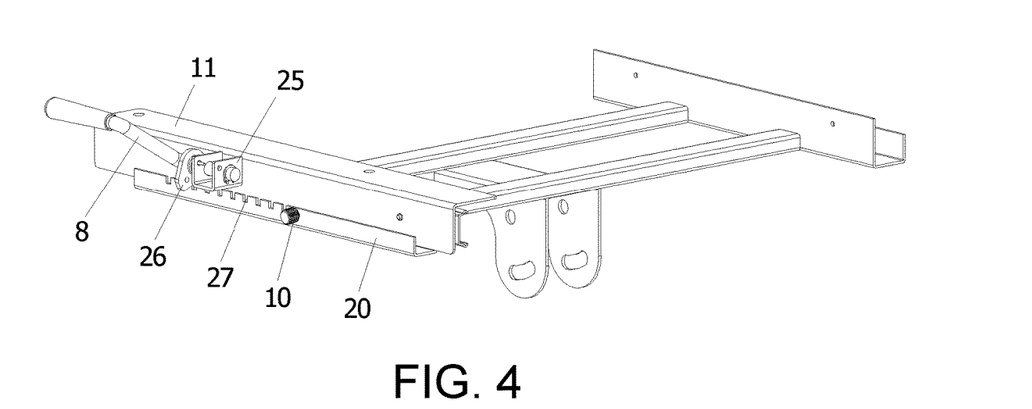
FIG. 4 is a schematic structural diagram of a sliding positioning mechanism in a sliding process.
Figure 5:
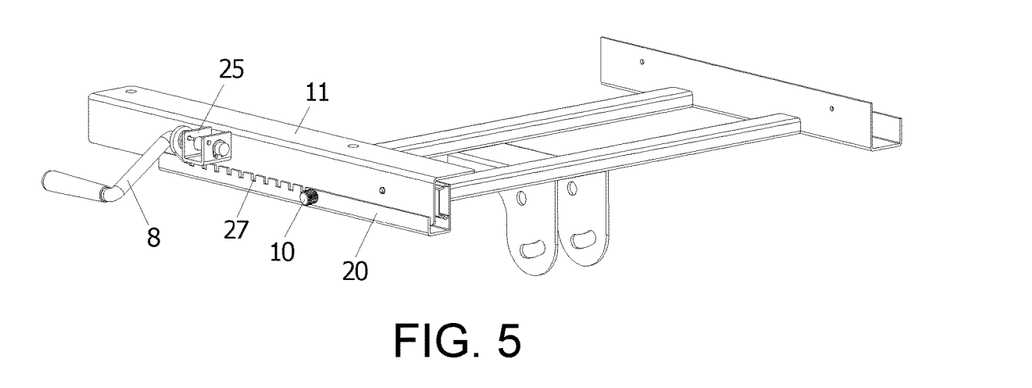
FIG. 5 is a schematic structural diagram of a sliding positioning mechanism sliding to a rearmost end.

The desk platform includes a primary tray 5 and a secondary tray 3, the primary tray 5 is provided with an installation slot, and the secondary tray 3 is installed in the installation slot by using a secondary-tray supporting block 4. Labor division and collaboration can be implemented, and it is convenient to place articles of different sizes, such as a mobile phone or a notebook computer.

A stop bar 24 is disposed in front of the secondary tray 3, and the stop bar 24 is fixed in the primary tray 5 transversely. Therefore, some relatively small articles such as a mobile phone and a tablet computer can be stopped.

The desk platform structure further includes a meter panel 1, where the meter panel 1 is installed at a front end of the primary tray 5 by using a meter panel fixing sheet 2, the meter panel fixing sheet 2 is of a bent structure, and two ends of the meter panel fixing sheet 2 are connected and fixed to the meter panel 1 and the primary tray 5 respectively in an insertion manner. Therefore, rapid dismounting or installing can be implemented.

The fixing base 17 has two fixing holes of a same structure and two arc guide holes 28 of a same structure from left to right, the arc guide holes 28 are located below the fixing holes, an upper end of the supporting rod 16 is installed in the fixing holes by using a fixing threaded rod 18 to form a rotatable structure, the supporting rod 16 and the arc guide holes 28 are connected by separately using a limit threaded rod 19 and a hand screw 15 to form an angle adjustable structure below the fixing threaded rod 18, the length of each of the arc guide hole 28 is greater than the diameter of the limit threaded rod 19 and the diameter of the hand screw 15, and the limit threaded rod 19 and the hand screw 15 have activity allowance in the arc guide hole 28. By loosening the hand screw 15, an angle between the supporting rod 16 and the fixing base 17 can be adjusted, thereby adjusting an inclination angle of the desk platform, so as to meet user requirements.

The braking space ring 23 is made of nylon (or rubber or soft plastic).

Figure 8:
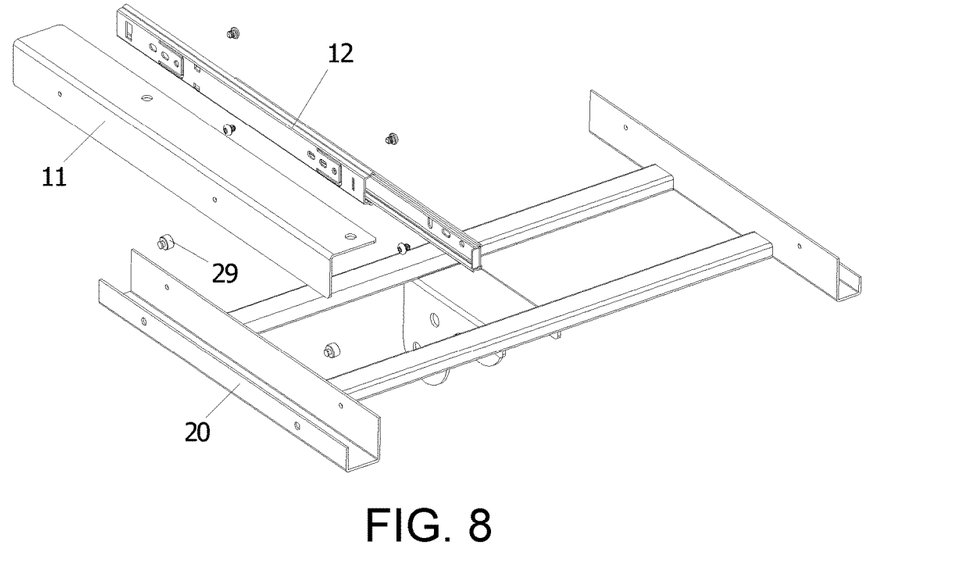
FIG. 8 is a schematic exploded diagram of a second preferable embodiment of a sliding braking structure.
Figure 9:
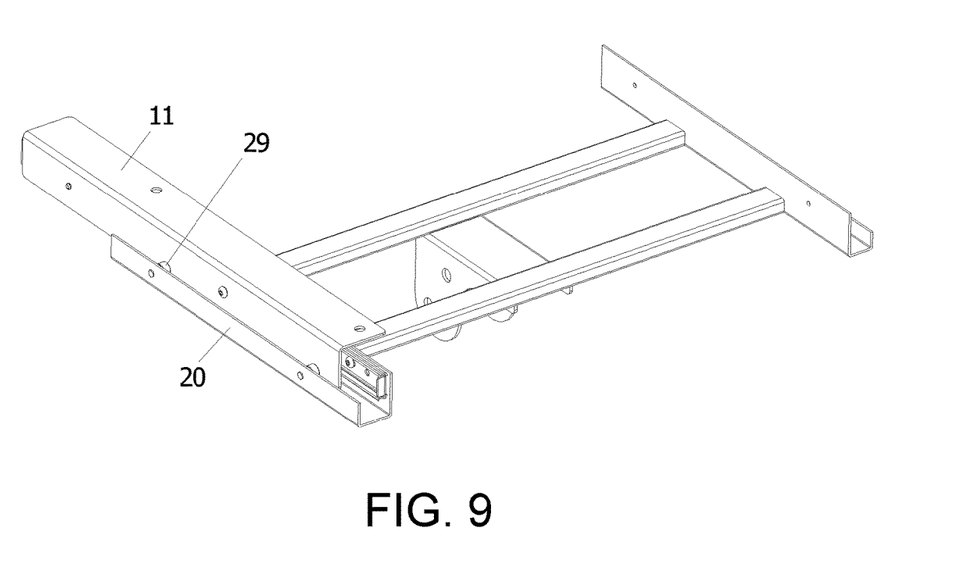
FIG. 9 is a schematic structural diagram of the second preferable embodiment of the sliding braking structure.

In a second embodiment, referring to FIG. 8 and FIG. 9, the braking mechanism configured to guarantee stable slip of the desk platform includes two groups of braking assemblies, the two groups of braking assemblies are disposed in tandem, each group includes an extrusion ring 29, the extrusion ring 29 is fixed in the guiding bar 20 on one side of the fixing rack 14, and an end surface of the extrusion ring 29 and an outer side surface of the fixing bar 11 are in interference fit, to form a structure having sliding friction between the extrusion ring 29 and the fixing bar 11; and the extrusion ring 29 is made of nylon. When the desk platform is slided, because the extrusion ring 29 has extrusion and friction actions on the fixing bar 11, first, the fixing bar 11 does not swing, to ensure entire stability of the desk platform; and secondly, the fixing bar 11 does not slide excessively quickly, and the sliding process is more gentle and stable, so that no article on the desk platform drops out even when the sliding occurs.

The present invention is described above in detail. The above description is only a preferable embodiment of the present invention, and should not be intended to limit the implementation scope of this application. That is, all equivalent changes and modifications made according to the scope of this application should fall within the scope of the present invention.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A desk platform structure for a fitness bike, comprising:
   a desk platform;
   a desk platform fixing and sliding mechanism; and
   a supporting rod, wherein the desk platform is installed on the desk platform fixing and sliding mechanism, the desk platform fixing and sliding mechanism is installed on the supporting rod, and the supporting rod is installed on a fitness bike, wherein the desk platform fixing and sliding mechanism comprises:

a pair of guiding bars;
a pair of fixing bars, the desk platform being installed on the fixing bars;
a pair of sliding rails, the fixing bars being installed on the sliding rails to form a slidable structure;
a fixing rack, having two opposite sides, the guiding bars respectively disposed at the two opposite sides of the fixing rack, each of the sliding rails fixed on one of the guiding bars;
a fixing base, disposed on the fixing rack, the fixing base and the supporting rod being connected to form a rotatable angle adjustment structure,
a braking mechanism configured to guarantee stable slip of the desk platform and disposed between the fixing bars and the fixing rack; and
a control mechanism configured to control sliding and positioning of the fixing bars and disposed between the fixing bars and the fixing rack, the control mechanism comprising:
an adjustment handle;
a torsional spring, sleeved over the adjustment handle;
an adjustment base, disposed on an outer side surface of one of the fixing bars at a side, and the adjustment handle being inserted in the adjustment base in a rotatable manner;
a positioning sheet, extending outward to form a cam shape and disposed on the adjustment handle, and two ends of the torsional spring being respectively fixed on the adjustment base and the positioning sheet to form a torque resetting structure; and
a plurality of positioning slots, disposed on a side wall of the one of the guiding bars at the same side as that of the fixing bar provided with the adjustment base, the positioning slots matching the positioning sheet, and the positioning sheet being locked in one of the positioning slots to form a slip stopping and positioning structure of the one of the fixing bars.

2. The desk platform structure according to claim 1, wherein a rubber cover for convenience of operation is sleeved over the adjustment handle, and a location at which the adjustment handle extends out of the adjustment base is provided with a shaft clip for auxiliary fixing; and a knurl wheel is disposed on the one of the guiding bars provided with the positioning slots, and the knurl wheel is disposed in front of a foremost positioning slot to form a forward-slip stopping structure for the one of the fixing bars.

3. The desk platform structure according to claim 1, wherein the braking mechanism configured to guarantee stable slip of the desk platform comprises two groups of braking assemblies, the two groups of braking assemblies are disposed in tandem, each group of the braking assemblies comprises:
a clamping base, fixed in the other one of the guiding bars by using a bolt;
a fixing shaft; and
a braking space ring, installed in the clamping base by using the fixing shaft, the braking space ring and an outer side surface of the other one of the fixing bars being in interference fit to form a structure having rolling friction between the braking space ring and the other one of the fixing bars, and the braking space ring being made of a soft material.

4. The desk platform structure according to claim 1, wherein the braking mechanism configured to guarantee stable slip of the desk platform comprises two groups of braking assemblies, the two groups of braking assemblies are disposed in tandem, each group of the braking assemblies comprises:
an extrusion ring, fixed in the other one of the guiding bars, and an end surface of the extrusion ring and an outer side surface of the other one of the fixing bars being in interference fit to form a structure having sliding friction between the extrusion ring and the other one of the fixing bars, and the extrusion ring being made of a soft material.

5. The desk platform structure according to claim 1, wherein the desk platform comprises:
a primary tray, provided with an installation slot; and
a secondary tray, installed in the installation slot by using a secondary-tray supporting block.

6. The desk platform structure according to claim 5, wherein a stop bar is disposed in front of the secondary tray, and the stop bar is fixed in the primary tray transversely.

7. The desk platform structure according to claim 5, further comprising:
a meter panel, installed at a front end of the primary tray by using a meter panel fixing sheet, the meter panel fixing sheet being of a bent structure, and two ends of the meter panel fixing sheet being connected and fixed to the meter panel and the primary tray respectively in an insertion manner.

8. The desk platform structure for a fitness bike according to claim 1, wherein the fixing base has two fixing holes of a same structure and two arc guide holes of a same structure from left to right, the arc guide holes are located below the fixing holes, an upper end of the supporting rod is installed in the fixing holes by using a fixing threaded rod to form a rotatable structure, the supporting rod and the arc guide holes are connected by separately using a limit threaded rod and a hand screw to form an angle adjustable structure below the fixing threaded rod, the length of each of the arc guide holes is greater than a diameter of the limit threaded rod and a diameter of the hand screw, and the limit threaded rod and the hand screw have activity allowance in the arc guide holes.

9. The desk platform structure for a fitness bike according to claim 3, wherein the braking space ring is made of nylon, rubber, or soft plastic.

10. A desk platform structure for a fitness bike, comprising:
a desk platform;
a desk platform fixing and sliding mechanism; and
a supporting rod, wherein the desk platform is installed on the desk platform fixing and sliding mechanism, the desk platform fixing and sliding mechanism is installed on the supporting rod, and the supporting rod is installed on a fitness bike, wherein the desk platform fixing and sliding mechanism comprises:
a pair of guiding bars;
a pair of fixing bars, the desk platform being installed on the fixing bars;
a pair of sliding rails, the fixing bars being installed on the sliding rails to form a slidable structure;
a fixing rack, having two opposite sides, the guiding bars respectively disposed at the two opposite sides of the fixing rack, each of the sliding rails fixed on one of the guiding bars;
a fixing base, disposed on the fixing rack, the fixing base and the supporting rod being connected to form a rotatable angle adjustment structure;

a control mechanism configured to control sliding and positioning of the fixing bars and disposed between the fixing bars and the fixing rack; and a braking mechanism configured to guarantee stable slip of the desk platform and disposed between the fixing bars and the fixing rack, the braking mechanism comprising two groups of braking assemblies, each group of the braking assemblies comprising:

a fixing shaft;

a clamping base, fixed in the one of the guiding bars by using a bolt; and a braking space ring, installed in the clamping base by using the fixing shaft, the braking space ring and an outer side surface one of the fixing bars being in interference fit to form a structure having rolling friction between the braking space ring and the one of the fixing bars, and the braking space ring being made of a soft material.

11. A desk platform structure for a fitness bike, comprising:

a desk platform;

a desk platform fixing and sliding mechanism; and a supporting rod, wherein the desk platform is installed on the desk platform fixing and sliding mechanism, the desk platform fixing and sliding mechanism is installed on the supporting rod, and the supporting rod is installed on a fitness bike, wherein the desk platform fixing and sliding mechanism comprises:

a pair of guiding bars;

a pair of fixing bars, the desk platform being installed on the fixing bars;

a pair of sliding rails, the fixing bars being installed on the sliding rails to form a slidable structure;

a fixing rack, having two opposite sides, the guiding bars respectively disposed at the two opposite sides of the fixing rack, each of the sliding rails fixed on one of the guiding bars;

a fixing base, disposed on the fixing rack, the fixing base and the supporting rod being connected to form a rotatable angle adjustment structure;

a control mechanism configured to control sliding and positioning of the fixing bars and disposed between the fixing bars and the fixing rack; and a braking mechanism configured to guarantee stable slip of the desk platform and disposed between the fixing bars and the fixing rack, the braking mechanism comprising two groups of braking assemblies, the two groups of braking assemblies are disposed in tandem, each group of the braking assemblies comprising:

an extrusion ring, fixed in the one of the guiding bars, and an end surface of the extrusion ring and an outer side surface of one of the fixing bars being in interference fit to form a structure having sliding friction between the extrusion ring and the one of the fixing bars, and the extrusion ring being made of a soft material.

* * * * *